March 6, 1945.      R. BLOW      2,371,023
SYNCHRONIZED DRIVE
Filed Feb. 8, 1943      2 Sheets—Sheet 2

Inventor:
Richard Blow.
By: Lee J. Gary
Attorney

Patented Mar. 6, 1945

2,371,023

UNITED STATES PATENT OFFICE 2,371,023

SYNCHRONIZED DRIVE

Richard Blow, Chicago, Ill., assignor to W. F. Hall Printing Company, Chicago, Ill., a corporation of Illinois Application February 8, 1943, Serial No. 475,190

10 Claims. (Cl. 172—293)

The present invention relates to synchronized drives for co-relating the operation of two machines or mechanisms so that said machines or mechanisms will function synchronously as a single unit. More particularly this invention relates to synchronizing of the drive shafts of two separate machines and wherein each of the machines includes a separate driving motor, together with electric control circuits for the motors by virtue of which one machine may be operated independently of the other.

One of the objects of this invention is to provide an improved electrically controlled synchronized drive of the character described wherein the control circuit for one machine is interconnected with the control circuit of the other machine in a manner to preclude operation of one machine unless the other machine is operating.

Another object is to provide an improved synchronized drive, characterized by the provision of two separate electrical control circuits interconnected in a manner to preclude operation of one machine unless the other machine is operating, and wherein said other machine may be operated independently of the said one machine.

A further object is to provide an improved synchronized drive of the character indicated wherein two separate machines are provided with electrical control circuits and separate motors for respectively driving separate shafts joined together by a free wheeling clutch and wherein one motor may be energized for driving its corresponding shaft only when the controlling circuit for the other motor is completed and driving its corresponding shaft and wherein the said one motor serves to drive its shaft at a speed slightly in excess of the speed of the other shaft to insure maintaining synchronized rotation of the two shafts.

A still further object is to provide an improved synchronized drive of the character indicated, including interconnected electrical control circuits by virtue of which one machine is normally permitted only to rotate at slow speed when the other machine is idle and by virtue of which both machines may be jointly operated synchronously at a relatively high rate of speed.

A still further object is to provide a novel synchronized drive of the character indicated which is relatively simple, inexpensive and capable of giving reliable service.

Other objects and advantages of this invention will be apparent from the following description, taken in connection with the accompanying drawings in which.

Figure 1:
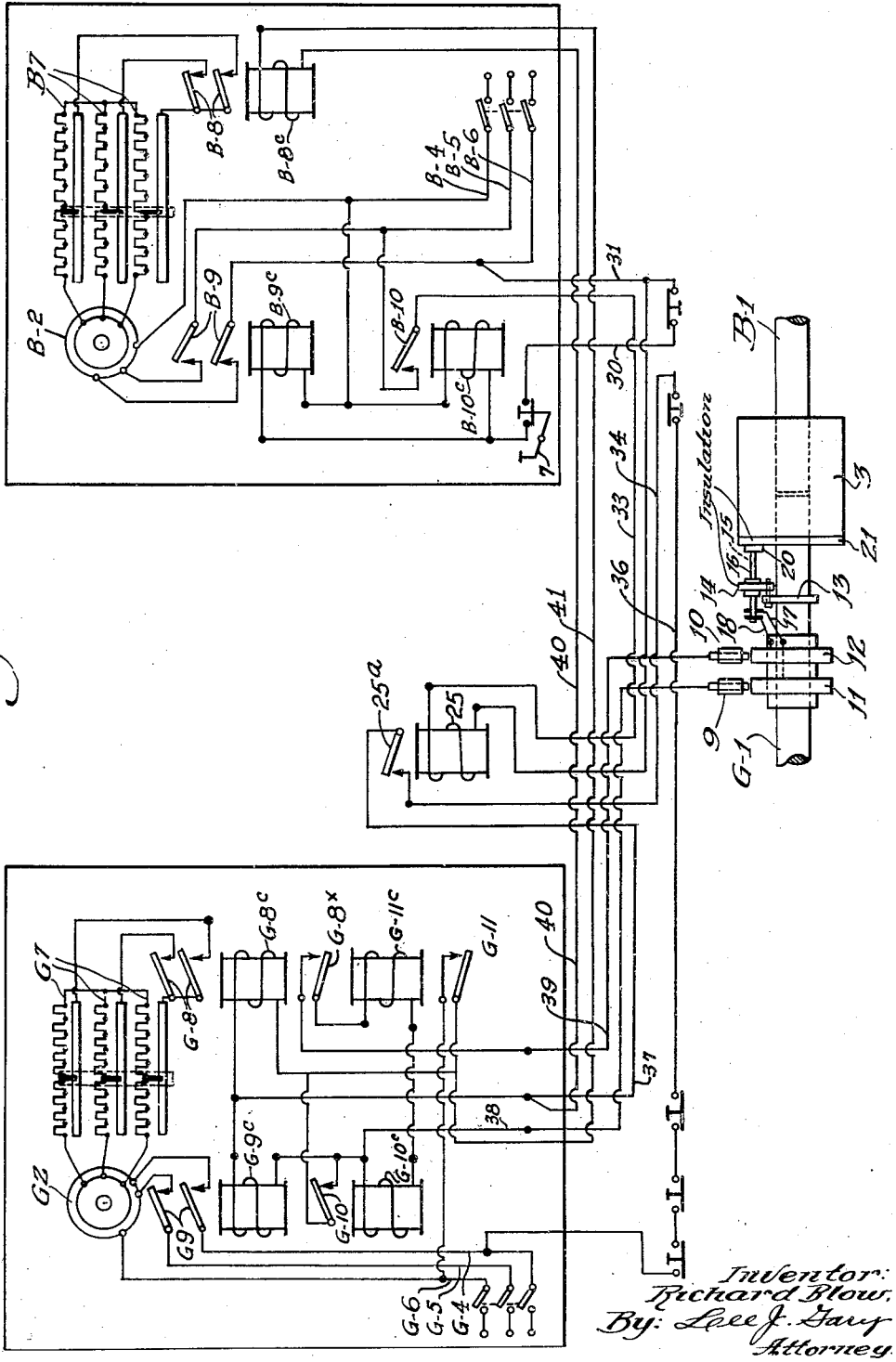
Fig. 1 is a schematic wiring diagram, including control mechanism embodying the present invention.
Figure 2:
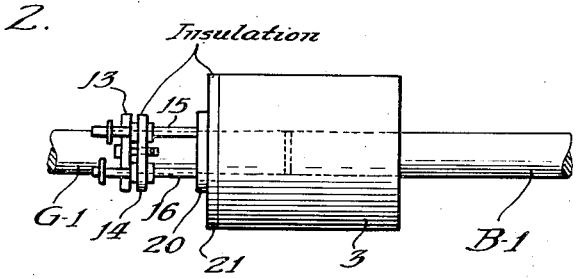
Fig. 2 is a fragmentary plan view of the free wheeling clutch interconnecting the two shafts of the respective machines together with circuit making devices.
Figure 3:
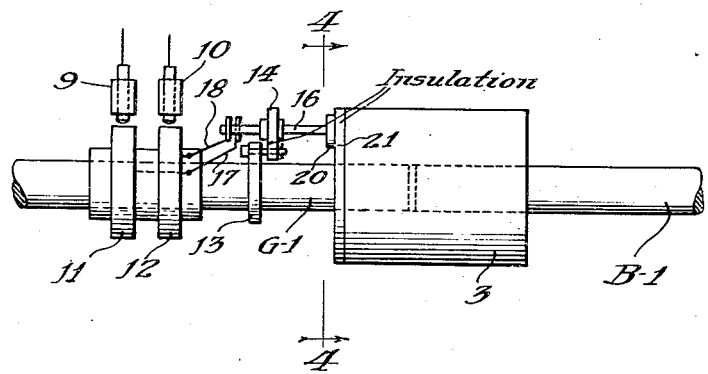
Fig. 3 is a view in side elevation of the free wheeling clutch and circuit making devices, representing an enlargement of the corresponding parts seen schematically in Fig. 1 of the drawings.
Figure 4:
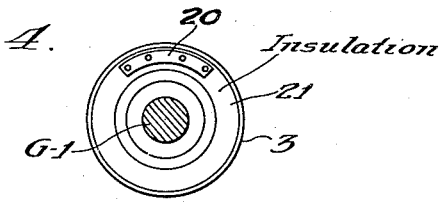
Fig. 4 is an end elevational view of the clutch housing, taken as indicated on line 4—4 on Fig. 3.

For purposes of clarity and to insure a proper and full understanding of my invention I will hereinafter describe the same as employed in connection with a gathering machine and binding machine. As is well known, these machines are utilized in the binding of leaflets, catalogs, books and the like, wherein a multiplicity of pages or sections constituting a book, catalog or the like are first assembled, in proper order, in loose fashion, and are then transmitted as separate, complete units, by means of a conveyor on the gathering machine, for delivery to a conveyor on the book binding machine, where suitable adhesive and/or other binding is applied to the unit of loose pages for connecting them permanently together.

The assembled unit of loose pages, as they are handled by the binding machine, are trimmed and adhesive and/or other binding is applied to the hinge edge in a manner well understood in the art. Inasmuch as these two respective machines, namely the gathering machine and binder, form no part of the present invention, I have accordingly omitted all illustration and reference thereto with the exception of the two shafts of the respective machines and their interconnection by which they are synchronized and which shafts for convenience I have designated herein as G1 and B1 respectively.

It may be understood that these shafts are driven through suitable gearing, not shown, from separate electrical motors designated respectively as G2 and B2. The shafts G1 and B1 are disposed in axial alignment with their ends in relatively close relationship to each other. Each of said shafts are provided with means, not shown, for operating conveyor devices on the respective gathering and binding machines. Therefore, by maintaining the shafts G1 and B1 in synchronized relationship to each other it is therefore possible to synchronize the relationship of the gathering conveyor to the conveyor of the binding machine. By synchronizing the drives of the two conveyors the efficiency of the two machines is considerably increased, and permitting dispensing with the manual services of several persons which were heretofore necessary to transmit the assembly of loose pages of the catalog, book, etc., from the gathering machine and placing them on the conveyor of the binding machine.

A single conveyor combining the functions of the gathering and binding machines could not be practically utilized because at times it is desired that the binding machine be permitted to function wholly independently of the gathering machine. Generally, however, it is desirable that the two machines function in timed or synchronous relation to each other. There may be, however, certain special occasions where it would be desired to operate the gathering machine independently of the binding machine and for such condition a separate control circuit, other than shown in the diagram herein, may be employed. In the proper use of the two machines for performing a continuous operation in the gathering and binding of books, catalogs and the like, it is highly desirable that the machines be so interconnected that the gathering machine cannot function unless the binding machine is already functioning.

Furthermore it is desirable that the gathering machine be provided with suitable controls which will permit it to be periodically stopped or arrested while the binding machine continues in operation. Hence, it is of utmost importance that when the gathering machine is restarted, while the binding machine is operating, that it start in phase or synchronized relation to the binding machine, otherwise the conveyors of the two machines would not be correlated so as to function as a single conveyor for handling continuously the gathered assemblies of loose sheets or pages of a catalog or book for transmission from the gathering machine to the binding machine.

By virtue of my present invention, as will hereinafter be more fully described, it is now possible to always maintain proper synchronized relationship of the conveyors of the two machines each time that the gathering machine is started during the time that the binding machine is already operating. To facilitate a clear understanding and to avoid confusion, reference will hereinafter be made to the parts of the binding machine as the main elements such as the main motor, main drive shaft, etc., and the reference characters will be preceded by the letter "B," whereas corresponding parts of the gathering machine will be designated as auxiliary motor, auxiliary shaft, etc., and said parts will in so far as practical be accorded the same numbers, preceded by the letter "G".

Mounted on the end of the main drive shaft B1 is a free wheeling clutch 3, which is connected to said shaft B1 for rotation therewith. The corresponding end of the shaft G1 is disposed in such correlation to the clutch that when said shaft G1 is idle the clutch 3 and the shaft B1 are still capable of free rotation. When, however, the shaft G1 is driven, it cannot rotate at a speed greater than the speed of travel of the clutch 3 due to the interlocking action of the clutch, which prevents the shaft, or to say it differently, the conveyor of the gathering machine from traveling at a speed greater than the speed of the conveyor of the binder. The clutch will, however, permit the drive shaft G1 to catch up to the speed of rotation of the drive shaft B1 of the binding machine. When the shaft G1 is driven, it is to be understood that due to suitable gearing or drive connections employed, it will be caused to rotate at a speed slightly greater than the speed of rotation of drive shaft B1, and as a result thereof the shaft G1 tends to drive the shaft B1 through the clutch 3.

In the wiring diagram I have indicated two panels, one designated "Gathering controller" and the other "Binding controller," in connection with which certain devices of the respective control circuits are illustrated. It is to be understood that each of the motors G2 and B2 are of the synchronous three phase type and include respectively power line connection G4, G5, and G6 and B4, B5 and B6. Each of the motors include adjustable field resistances indicated at G7 and B7, adapted to be cut into and out of the electrical circuits for obtaining operation of the respective motors at a desired speed. For this purpose I employ in the circuits of the respective motors a pair of switches indicated at G8 and B8. In the power lines G4 and G6, and in B4 and B6 of the respective controls, I employ a pair of switches indicated respectively at G9 and B9.

Because of the great length of the gathering machine it is desirable that the operation of the machine be capable of control at several spaced apart points along the length thereof, and for this purpose there is provided a plurality of manually operated switches indicated at 5. Another manually operated switch similar to switch 5 and designated 5ª is preferably located near the junction of the conveyors of the gathering and binding machines. I also employ a master switch 6 adjacent the junction of the conveyors of the two machines by virtue of which both machines may be simultaneously arrested as distinguished from switches 5 and 5ª which merely make or break the electrical circuits for controlling the gathering machine.

Located on the binding machine is a suitable starting and stopping switch indicated at 7 which is connected in series with the switch 6 and thus necessitates the closure of both of the switches in order to complete the electrical circuit for operation of the binding machine, as will be presently described.

Connected in the electrical control circuit of the gathering machine are two contact brushes, indicated at 9 and 10, positioned for contacting collector rings indicated at 11 and 12, mounted upon and rotatable with the gathering machine drive shaft G1. A mounting member 13 is secured on the shaft G1 and carries a panel 14 of insulating material on which is supported a pair of spaced apart, longitudinally extending, contact points 15 and 16. The contact point 15 is connected by a conductor wire 17 to the collector ring 11, while the contact point 16 is connected by conductor wire 18 to collector ring 12. It will now be apparent that the two contact points 15 and 16, by virtue of their mounting on the panel 14 are rotatable as a unit with the gathering machine drive shaft G1. Mounted on the adjacent end of the housing of the clutch 3 is an arcuate conductor plate 20 of high electrically conductive material such as brass and which, in turn, is mounted on an insulating disk 21 carried on the adjacent end of the housing of the clutch 3. The plate 20, in certain positions of angular relationships of the shafts G1 and B1, serves to bridge the contact points 15 and 16 and complete portions of an electrical circuit of the gathering controller and which under certain conditions makes it possible for the two shafts G1 and B1 to rotate in synchronism.

As above stated the shaft G1 may at times be stationary during the time that drive shaft B1 of the binding machine is rotating. It is desired, however, that when the drive shaft G1 rotates that it does so in synchronized relationship to the drive shaft B1. Hence, when the shaft G1 is stationary while shaft B1 rotates, the contact plate 20 will periodically bridge the contacts 15 and 16 but it will perform no function in the control circuit of the gathering machine because the circuit is open at other places, as will be described.

The control circuit of the binder controller includes coils B8C, B9C, and B10C, which serve to control the switches B8, B9 and B10. The conductor wires indicated at B4L and B6L may be connected to the same sources of power supply as the motor power lines indicated at B4 and B6 respectively. It is to be understood that the coils B8C, B9C and B10C, together with their corresponding switches B8 and B9 anw B10, are conventional relays and when the respective coils are energized the corresponding switches are closed.

The relay coil B8C, through its switches B8 controls the resistance of the motor B2. The coil B8C, however, is connected in the electrical circuit of the gathering controller and is only energized when the circuit of the gathering controller is completed, hence, the switches B8 are normally open. Therefore, when the motor B2 is first energized the resistances B7 cause the motor B2 to be driven at a slow speed. It may be understood that when the resistances are short circuited by the closing of switches B8, the motor is then driven at a relatively high speed.

In the electrical circuit of the gathering controller the coils designated as G8C and G9C control respectively the switches G8 and G9. The coil G10C controls the switch G10 while the coil G11C controls the switch G11. It will also be noted that the coil G8C controls the switch G8X which is connected in series with the coil G11C. The main power lines designated at G4L and G6L are adapted to be connected to the respective power terminals to which the power lines G4 and G6 of the motor G2 are connected.

A relay coil 25 controls a switch 25ª, which is connected in the electrical control circuit of the gathering controller, and serves to permit completion of the circuit of the gathering machine only when the electrical circuit of the binding machine is completed.

I will now describe the operation of the respective circuits of the binding machine and the gathering machine and the operation of the circuit of the binding machine, will be first described. When the main switch 6 is closed the starter switch 7 is then moved to a closed position. Current then flows from the source of power supply through supply line B4L, switch 7, through the conductor wire 30, main switch 6, through conductor wire 31, through the coils B9C and B10C to the power supply line B5L. The coils B9C and B10C thus become energized and close the switches B9 and B10. The switches B9 thus complete the circuit of the motor B2, while the switch B10 controls a separate circuit including electrically operated devices such as solenoids which in turn control the brakes on the binding machine and when the circiut is completed through the switch B10 the brakes on the machine are released and as soon as the switch B10 opens the circuit the brakes are applied.

The closing of the switches B9 in the main power supply line B4 and B6 of the motor B2, thus permits the motor to start up at slow speed, and for purposes of illustration it may be stated that the speed of the motor is such that the main drive shaft B1 is rotated at approximately 20 R. P. M. The binding machine will continue to operate at this speed unless affected by closing of the circuit of the gathering machine, or unless either of the switches 6 or 7 are opened, thereby breaking the circuit to the motor B2.

In this connection it may be pointed out that the relay 25 and its corresponding switch 25ª functions as an interlocking control. The coil 25 is connected by conductor wires 33 and 34 to the power supply lines B5 and B6 respectively, of the source of supply for the motor B2. The switch B10 in addition to its other function also serves to control the completion of the circuit including the coil 25. Obviously when the coil 25 is energized the switch 25ª is closed so as to complete or condition a portion of the control circuit of the gathering machine. It will be noted in this respect that the relay coil 25 cannot be energized until the coil B9 has been energized to close its corresponding switches B9, one of which is located in the main power supply line B6 of the circuit of the motor B2, ahead of the connection with the conductor wire 34.

As above stated the gathering machine cannot be operated as long as the switch 25ª of the interlocking control is open, but as soon as the binder is operating switch 25ª is closed. When it is desired to operate the gathering machine, during the time that the binder machine is operating, the switches 5 and 5ª must first all be closed because these switches are all connected in series with each other as above stated, and are located at spaced apart joints along the conveyor of the gathering machine.

When these switches 5 and 5ª are closed, (subject to the control by the clutch 3) current is supplied from the main supply line G4L through the switches 5 and 5ª through a conductor wire 36, through the switch 25ª and conductor wire 37 through the coils G9C and G10C and conductor wire 38, to the brush 9 and through the collector ring 11 and conductor wire 17 to the contact 15, through the bridging plate 20, back through the contact point 16 and its conductor wire 18 and collector ring 12 through the brush 10 and conductor wire 39, to the main power supply line G6L. It may be well to here state that this circuit, with switches 5 and 5ª closed, is completed only when the shaft B1 carrying the clutch 3 rotates and disposes the contact plate 20 in position to bridge the ends of the contact points 15 and 16. When the coils G9C and G10C are energized they close respectively, their corresponding switches G9 and G10, switches G9 being connected in two of the main power lines G4 and G6 to the motor G2. The motor G2 is thus started at a relatively slow speed. Upon closing of the switch G10 the relay coil G8 is energized by being coupled in a circuit with the conductors 37 and 39 and this energized coil then closes the switches G8, associated with the resistances of the motor and by virtue of which the resistances are short circuited so as to cause the motor G2 to rotate at relatively high speed. The energizing of the coil G8C also results in the closing of the switch G8X, resulting in energizing of the coil G11C connected by the conductor wire 37, directly to the main power supply line G6L.

When the coil G11C is energized it closes the switch G11 and thus serves to hold or maintain the electrical circuit including the coils G9C, G10C, G8C and G11C. The coil G11C is a low voltage relay coil and may for convenience be termed a holding relay because of its function, serving to hold the electrical circuit after it has once been established.

When the coils G9C and G10C become energized, it may be understood that there is a delaying action before the coil G8C is energized which controls the short circuiting of the resistances of the motor G2, and during this period current also flows from conductor wire 37, through a conductor wire 40 through the relay coil B8C of the binder control circuit and back through a conductor wire 41 and thence to the main power supply line G3L in a manner described in connection with the energizing of the coils G9C and G10C. When the coil B8C of the binder control circuit is energized the switches B8 associated with the resistances of the motor B2 are closed and results in short circuiting of the resistance to cause the binder motor B2 to rotate at high speed.

It may be assumed that for all practical purposes the respective coils G8C of the gathering machine and B8C of the binder machine operate substantially simultaneously so that the shafts G1 and B1 are simultaneously brought up to high speed. Because the shaft G1 rotates at a speed slightly in excess of the high speed of the shaft B1, there will be a tendency for the shaft G1 to drive the shaft B1 through the clutch 3 and thereby constantly maintains proper relationship of the contact points 15 and 16 with the bridging plate 20, carried by the free wheeling clutch 3.

When any one of the switches 5 or 5ª is opened, the circuit to the gathering machine, including the motor, is immediately broken, and also results in de-energizing of the coils B8C, causing the motor B2 of the binding machine to rotate at relatively low speed because of the opening of the switches B8, placing the resistances back in the motor field.

It will also be apparent that when both of the circuits are completed and the shaft G1 and B1 are synchronously driven, both of the machines may be simultaneously arrested by the opening of the main switch 6.

Although I have shown and described a preferred embodiment of my invention, manifestly it is capable of modification and rearrangement of parts without departing from the spirit and scope thereof. I do not, therefore, wish to be understood as limiting this invention to the precise form herein disclosed, except as I may be so limited in the appended claims.

I claim as my invention:

1. In a synchronized drive of the character described, the combination of a main drive shaft, a main motor for driving said shaft, an auxiliary drive shaft, an auxiliary motor for driving said auxiliary shaft, at a speed slightly in excess of the speed of rotation of said main drive shaft, said shafts being rotatable in the same direction and being disposed in axial alignment in close end to end relation, and a free wheeling clutch carried by and positively connected to the main drive shaft for rotation therewith and disposed in position to be operably engaged and driven by said auxiliary drive shaft.

2. In a synchronized drive of the character described, the combination of a main drive shaft, a main motor for driving said shaft, an auxiliary drive shaft, an auxiliary motor for driving said auxiliary shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated switch in each of said circuits, and means responsive to energization of the control circuit for the main motor for completing a portion of the control circuit of said auxiliary motor.

3. In a synchronized drive of the character described, the combination of a main drive shaft, a main motor for driving said shaft, an auxiliary drive shaft, an auxiliary motor for driving said auxiliary shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated switch in each of said circuits, and a relay connected for energization by the control circuit of the main motor and serving to control said control circuit of the auxiliary motor, whereby said auxiliary motor is adapted to be driven only when the electrical circuit for the main motor is closed and when the switch of said auxiliary circuit is closed.

4. In a synchronous drive of the character described, the combination of a main drive shaft, a main motor for driving said shaft, an auxiliary drive shaft, an auxiliary motor for driving said auxiliary shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated control switch in each of said circuits, means interconnecting said circuits for precluding completion of the auxiliary circuit except when said main circuit is completed, a bridging contact plate carried on the end face of said clutch adjacent the auxiliary drive shaft and connected in said auxiliary circuit, and a pair of separate contacts carried on and rotatable with said auxiliary drive shaft and connected to the respective collector rings, said contacts being positioned to simultaneously engage said contact plate on the clutch when the latter turns relatively to the auxiliary drive shaft for completing a portion of the auxiliary circuit, whereby the switch of the auxiliary circuit permits breaking of said auxiliary circuit independently of the main circuit and whereby said interconnecting means precludes completion of said auxiliary circuit when said main circuit is open.

5. In a synchronous drive of the character described, the combination of a main drive shaft, a main motor for driving said shaft, an auxiliary drive shaft, an auxiliary motor for driving said auxiliary shaft, at a speed slightly in excess of the speed of rotation of said main drive shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated control switch in each of said circuits, means interconnecting said circuits for precluding completion of the auxiliary circuit except when said main circuit is completed, a bridging contact plate carried on the end face of said clutch adjacent the auxiliary drive shaft, a pair of slip ring collectors on the auxiliary drive shaft and connected in said auxiliary circuit, and a pair of separate contacts carried on and rotatable with said auxiliary drive shaft and connected to the respective collector rings, said contacts being positioned to simultaneously engage said contact plate on the clutch when the latter turns relatively to the auxiliary drive shaft for completing a portion of the auxiliary circuit, whereby the switch of the auxiliary circuit permits breaking of said auxiliary circuit independently of the main circuit and whereby said interconnecting means precludes completion of said auxiliary circuit when said main circuit is open.

6. In a synchronized drive of the character described, the combination of a main drive shaft, a main motor for driving said shaft, an auxiliary drive shaft, an auxiliary motor for driving said auxiliary shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated switch in each of said circuits, means responsive to energization of the control circuit for the main motor for completing a portion of the control circuit of said auxiliary motor, an electrical resistance in the main motor for causing said motor to be normally driven at slow speed, and means in the auxiliary circuit adapted when said circuit is completed to short circuit said resistance for causing said main motor to be driven at high speed.

7. In a synchronized drive of the character described, the combination of a main drive shaft, a main motor for driving said shaft, an auxiliary drive shaft, an auxiliary motor for driving said auxiliary shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated switch in each of said circuits, means responsive to energization of the control circuit for the main motor for completing a portion of the control circuit of said auxiliary motor, an electrical resistance in the main motor for causing said motor to be normally driven at slow speed, means in the auxiliary circuit adapted when said circuit is completed to short circuit said resistance for causing said main motor to be driven at high speed, an electrical resistance in the auxiliary motor for initially causing said motor to be driven at slow speed upon completion of the auxiliary circuit, and means in said auxiliary circuit for short circuiting said resistance for causing said motor to be driven at high speed.

8. In a synchronous drive of the character described, the combination of a main drive shaft, a main motor for driving said shaft, an auxiliary drive shaft, an auxiliary motor for driving said auxiliary shaft, at a speed slightly in excess of the speed of rotation of said main drive shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated control switch in each of said circuits, means interconnecting said circuits for precluding completion of the auxiliary circuit except when said main circuit is completed, a bridging contact plate carried on the end face of said clutch adjacent the auxiliary drive shaft, a pair of slip ring collectors on the auxiliary drive shaft and connected in said auxiliary circuit, a pair of separate contacts carried on and rotatable with said auxiliary drive shaft and connected to the respective collector rings, said contacts being positioned to simultaneously engage said contact plate on the clutch when the latter turns relatively to the auxiliary drive shaft for completing a portion of the auxiliary circuit, whereby the switch of the auxiliary circuit permits breaking of said auxiliary circuit independently of the main circuit and whereby said interconnecting means precludes completion of said auxiliary circuit when said main circuit is open, an electrical resistance in the main motor for causing said motor to be normally driven at slow speed, and means in the auxiliary circuit adapted when said circuit is completed to short circuit said resistance for causing said main motor to be driven at high speed.

9. In a synchronous drive of the character described, the combination of a main drive shaft, a main motor for driving said shaft, an auxiliary drive shaft, an auxiliary motor for driving said auxiliary shaft, at a speed slightly in excess of the speed of rotation of said main drive shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated control switch in each of said circuits, means interconnecting said circuits for precluding completion of the auxiliary circuit except when said main circuit is completed, a bridging contact plate carried on the end face of said clutch adjacent the auxiliary drive shaft, a pair of slip ring collectors on the auxiliary drive shaft and connected in said auxiliary circuit, a pair of separate contacts carried on and rotatable with said auxiliary drive shaft and connected to the respective collector rings, said contacts being positioned to simultaneously engage said contact plate on the clutch when the latter turns relatively to the auxiliary drive shaft for completing a portion of the auxiliary circuit, whereby the switch of the auxiliary circuit permits breaking of said auxiliary circuit independently of the main circuit and whereby said interconnecting means precludes completion of said auxiliary circuit when said main circuit is open, an electrical resistance in the main motor for causing said motor to be normally driven at slow speed, means in the auxiliary circuit adapted when said circuit is completed to short circuit said resistance for causing said main motor to be driven at high speed, an electrical resistance in the auxiliary motor for initially causing said motor to be driven at slow speed upon completion of the auxiliary circuit, and means in said auxiliary circuit for short circuiting said resistance for causing said motor to be driven at high speed.

10. In a synchronized drive of the character described, the combination of a main drive shaft, a main synchronous motor for driving said shaft, an auxiliary drive shaft, an auxiliary synchronous motor for driving said auxiliary shaft, said shafts being rotatable in the same direction and being disposed in axial alignment in close end to end relation, a free wheeling clutch carried by and positively connected to the main drive shaft for rotation therewith and disposed in position to be operably engaged and driven by said auxiliary drive shaft, electrical control circuits for each of said motors, a manually operated switch in each of said circuits, and means responsive to energization of the control circuit for the main motor for completing a portion of the control circuit of said auxiliary motor.

RICHARD BLOW.